US00RE37642E

(19) United States
(12) Reissued Patent
Goldstein

(10) Patent Number: US RE37,642 E
(45) Date of Reissued Patent: Apr. 9, 2002

(54) AIR HEATER WITH ANGLED PTC HEATERS PRODUCING DIVERGING HEATED AIRFLOW

(75) Inventor: Andrew M. Goldstein, Newton, MA (US)

(73) Assignee: The Holmes Group, Inc., Milford, MA (US)

(21) Appl. No.: 08/941,408

(22) Filed: Sep. 30, 1997

Related U.S. Patent Documents

Reissue of:
(64) Patent No.: 5,513,296
Issued: Apr. 30, 1996
Appl. No.: 08/255,357
Filed: Jun. 8, 1994

(51) Int. Cl.[7] ..... H05B 3/00; F24H 3/02
(52) U.S. Cl. ..... 392/367; 392/368; D23/335
(58) Field of Search ..... 392/363–371, 392/373, 374, 379–385, 491, 360; D23/335, 332, 328

(56) References Cited

U.S. PATENT DOCUMENTS

| | | | | | |
|---|---|---|---|---|---|
| 1,620,767 | A | * | 3/1927 | Johnson | 392/367 |
| 1,942,758 | A | * | 1/1934 | Jessup | 392/367 |
| 2,167,122 | A | * | 7/1939 | Metcalf | 392/367 |
| 2,232,492 | A | * | 2/1941 | Steingruber | 392/376 |
| 2,359,021 | A | * | 9/1944 | Campbell et al. | 392/367 |
| 2,883,512 | A | * | 4/1959 | Winther | 392/367 |
| 3,051,820 | A | * | 8/1962 | Krichton | 392/376 |
| 3,341,689 | A | * | 9/1967 | Reichenbach | 392/367 |
| 3,627,038 | A | * | 12/1971 | Wilkins | 165/126 |
| 3,627,985 | A | * | 12/1971 | Hostetler | 392/367 |
| 3,927,300 | A | * | 12/1975 | Wada et al. | 392/502 |
| 4,110,600 | A | * | 8/1978 | Spotts et al. | 392/368 |
| 4,331,860 | A | * | 5/1982 | Roller et al. | 219/544 |
| 4,346,285 | A | * | 8/1982 | Nakamura et al. | 219/540 |
| 4,459,466 | A | * | 7/1984 | Nakagawa et al. | 392/307 |
| D277,780 | S | * | 2/1985 | Horst, Sr. et al. | D23/122 |
| 4,518,847 | A | * | 5/1985 | Horst, Sr. et al. | 392/358 |
| 4,626,666 | A | * | 12/1986 | Maeda et al. | 219/537 |
| 4,703,153 | A | * | 10/1987 | Pelonis | 392/368 |
| 4,734,560 | A | * | 3/1988 | Bowen | 392/390 |
| 4,737,616 | A | * | 4/1988 | Wen-Ying | 392/365 |

(List continued on next page.)

FOREIGN PATENT DOCUMENTS

| | | | | |
|---|---|---|---|---|
| EP | 400381 | * | 12/1990 | |
| FR | 929954 | * | 1/1948 | 392/367 |
| FR | 958137 | * | 3/1950 | 392/367 |
| GB | 965239 | * | 7/1964 | 392/346 |

OTHER PUBLICATIONS

Heattech Sales Brochure, Texaco Marketing Center, 701 E. Prospect Ave., Mt. Prospect IL 60056–3749, Date unknown.*

Patton WH–80 Heater Advertisement (Item J7–3812), "Heartland America" catalog, Nov. 1994, Heartland America, 6978 Shady Oak Rd., Eden Prairie MN 55344–3453, 1–800–229–2901.*

*Primary Examiner*—John A. Jeffery
(74) *Attorney, Agent, or Firm*—Hoffmann & Baron, LLP; Francis E. Marino

(57) ABSTRACT

A positive temperature coefficient (PTC) heater includes a housing, a fan mounted within the housing, a pair of positive temperature coefficient (PTC) heater assemblies disposed in the housing, and a plenum mounted in the housing. The housing includes a front portion and a rear portion connected together to define a front, a rear, a left side and a right side, the front and rear each having at least one opening. The fan is arranged to produce a flow of air from the rear of the housing to the front. The pair of positive temperature coefficient (PTC) heater assemblies are disposed in side by side relationship and angled relative to each other, each at an angle of approximately 7.5 degrees from normal, so as to produce a diverging column of heated air. The plenum mounted in the housing directs the air flow produced by the fan through each of the PTC heater assemblies.

14 Claims, 5 Drawing Sheets

U.S. PATENT DOCUMENTS

D296,467 S * 6/1988 Wen-Yiing ..... D23/328
4,855,570 A * 8/1989 Wang ..... 219/532
4,965,432 A * 10/1990 Harris ..... 219/203
5,057,672 A * 10/1991 Bohlender et al. ..... 392/360
D325,251 S * 4/1992 Schindler et al. ..... D23/328
5,125,070 A * 6/1992 Chung-Tai ..... 392/365
D331,457 S * 12/1992 De'Longhi ..... D23/328
5,197,112 A * 3/1993 Cameron ..... 392/365
D337,635 S * 7/1993 Schindler et al. ..... D23/328
5,245,692 A * 9/1993 Kawai ..... 392/367
D340,971 S * 11/1993 Pirro ..... D23/328
D349,761 S * 8/1994 Cunning ..... D23/337
5,376,772 A * 12/1994 Nakagawa et al. ..... 392/385
5,377,298 A * 12/1994 Yang ..... 392/360
D354,343 S * 1/1995 Goldstein ..... D23/335
5,377,424 A * 1/1995 Albanes ..... 392/381
5,437,001 A * 7/1995 Chaney et al. ..... 392/376

* cited by examiner

AIR HEATER WITH ANGLED PTC HEATERS PRODUCING DIVERGING HEATED AIRFLOW

Matter enclosed in heavy brackets [ ] appears in the original patent but forms no part of this reissue specification; matter printed in italics indicates the additions made by reissue.

BACKGROUND OF THE INVENTION

The present invention relates generally to electric heaters and more specifically to positive temperature coefficient (PTC) electric heaters.

Two well-known types of electric heaters are the resistance-wire heater and the positive temperature coefficient (PTC) heater. In a resistance-wire heater, heat is produced by passing current through an electric wire. In a PTC heater, heat is produced by passing current through a plurality of electrically interconnected PTC (ceramic) pellets. The primary drawback of the resistance-wire heater is its propensity for overheating, which can often result in a fire if there are flammable items within the heater's immediate vicinity. More specifically, the heat source in a resistance-wire heater can often reach temperatures as high as 1600 degrees fahrenheit, well above the limit of combustible materials. Without installing a an effective safety mechanism in the resistance-wire heaters, the possibility of overheating and fire is present.

In contrast to the resistance-wire type heaters, the possibility of overheating and fire in a PTC heater is not present. This is a result of the self-limiting characteristic of the PTC element's temperature. Due to the physical chemistry of the doped ceramic material of which the PTC elements are made in a PTC heater, the PTC elements effectively shut off at a relatively low temperature. Typically, once a PTC element's temperature rises to approximately 340 degrees fahrenheit, the resistance of the element rises to a point to completely eliminate the flow of current through it, thereby preventing any further rising of the FTC element's temperature. This physical characteristic of a ceramic FTC heater element prevents overheating and eliminates the possibility of fire.

In addition, FTC heaters are more durable than resistance-wire heaters. A limitation of PTC heaters, however, is that the heat produced is directed over a relatively small area. This is due primarily to the size and shape of the heater assembly containing the ceramic pellets.

Some pertinent patents include U.S. Pat. Nos. 5,245,692, 5,197,112, 4,965,432, 4,737,616, 4,703,153, 4,518,847, and 4,459,466.

SUMMARY OF THE INVENTION

It is an object of the present invention to provide a new and improved PTC heater.

It is another object of the present invention to provide a PTC heater which is small in volume and which can generate a large amount of heat.

It is still another object of the present invention to provide a PTC heater which disperses the heat emitted over a large area.

It is yet another object of the present invention to provide a PTC heater which can be mass produced, has a minimal number of parts, and can be easily assembled.

In furtherance of the objects broadly set forth above, a positive temperature coefficient (PTC) heater is provided which comprises a housing having a front and a rear, the front and rear each having at least one opening therein, a fan mounted within the housing for producing a flow of air in from the opening in the rear and out through the opening in the front, a pair of positive temperature coefficient (PTC) heater assemblies disposed in the housing in front of the fan in side by side relationship and angled relative to each other, and a plenum mounted in the housing for directing the air flow produced by the fan toward the PTC heater assemblies.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF A PREFERRED EMBODIMENT

Figure 1:
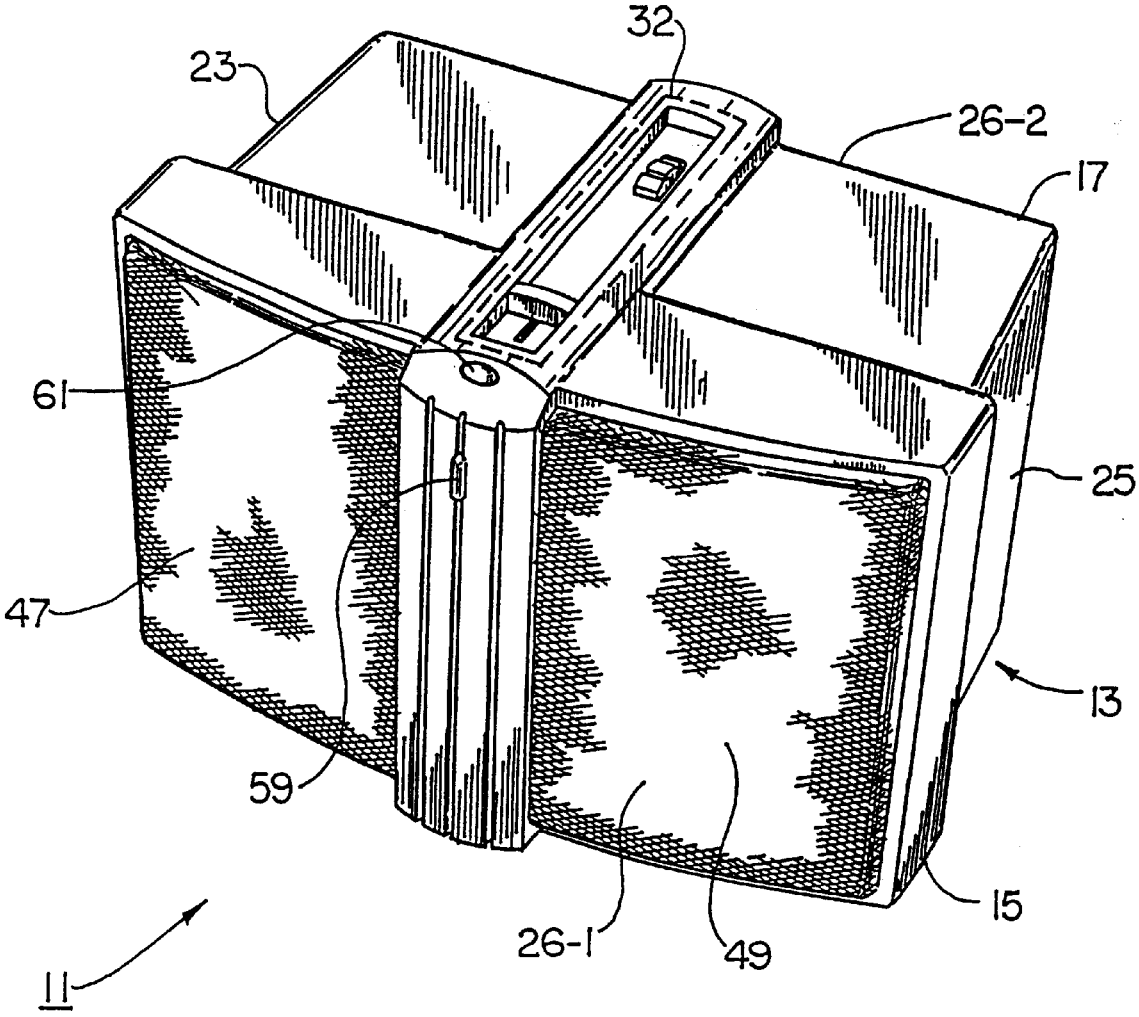
FIG. 1 is a perspective view of a positive temperature coefficient (PTC) heater constructed according to this invention.
Figure 2:
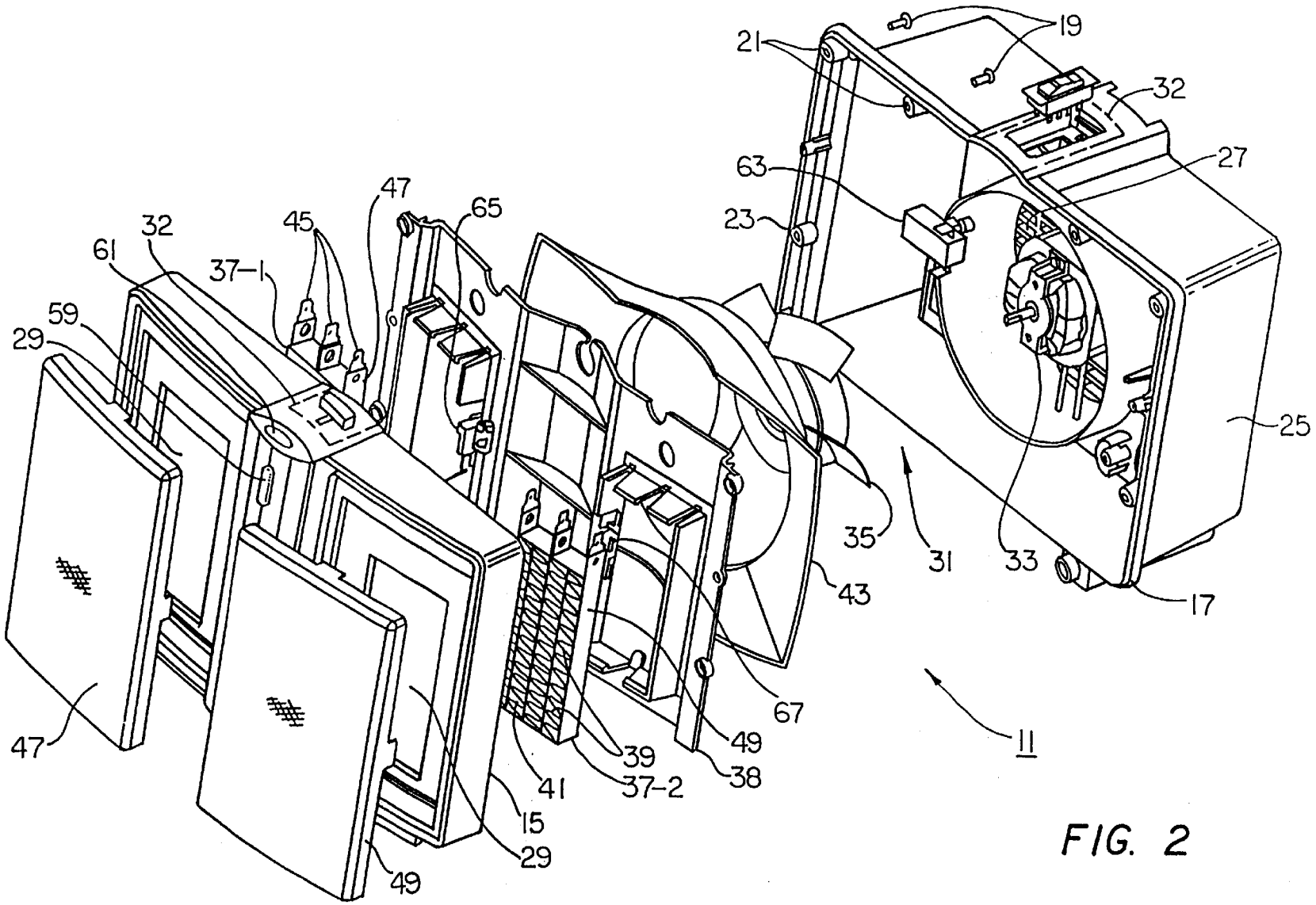
FIG. 2 is an exploded perspective view of the heater shown in FIG. 1.

Referring now to the drawings and more particularly to FIGS. 1 and 2, there is shown one embodiment of a positive temperature coefficient (PTC) heater constructed according to the teachings of the present inventor, the PTC heater being represented generally by reference numeral 11.

Heater 11 includes a housing 13 comprising a front portion 15 and a rear portion 17. Front portion 15 and rear portion 17 are attached together by means of screws 19 threaded through holes 21, or by any similar connective means to define a structure having a left side 23, a right side 25, a front 26-1, and a rear 26-2. Rear portion 17 includes an opening 27 through which air enters heater 11 and front portion 15 includes a pair of opening 29-1 and 29-2 through which air exits heater 11.

An electric fan 31 is fixedly mounted inside housing 13. Electric fan 31 comprises a motor 33 and a set of fan blades 35. Activating electric fan 31 by means of main switch 32 creates a flow of air from opening 27 into heater 11 and out through the pair of openings 29-1 and 29-2.

A pair of positive temperature coefficient (PTC) heater assemblies 37-1 and 37-2 are mounted on a PTC heater assembly housing 38 disposed inside housing 13, in front of electric fan 31 and in a side-by-side relationship. PTC heater assemblies 37-1 and 37-2 are rectangular in cross-section and each comprise a plurality of ceramic PTC pellets 39 held in a grid of conductive material 41. By activating main switch 32, an electric current is supplied to PTC heater assemblies 37-1 and 37-2 through prongs 45 causing ceramic pellets 39 to heat up. The heat produced by ceramic pellets 39 is then efficiently radiated forward by an air flow produced by electric fan 31.

A plenum 43 is mounted in the front portion of rear portion 17, situated immediately in front of fan 35 and immediately behind PTC heater assemblies 37-1 and 37-2. Once electric fan 31 is activated by main switch 32, thereby producing a flow of air through heater 11 originating from rear air inlet 27, plenum 43 serves the function of directing the flow of air through PTC heater assemblies 37-1 and 37-2, thereby ensuring that the flow of air passes through the PTC heater assemblies 37-1 and 37-2 and does not recirculate throughout heater 11.

Figure 3:
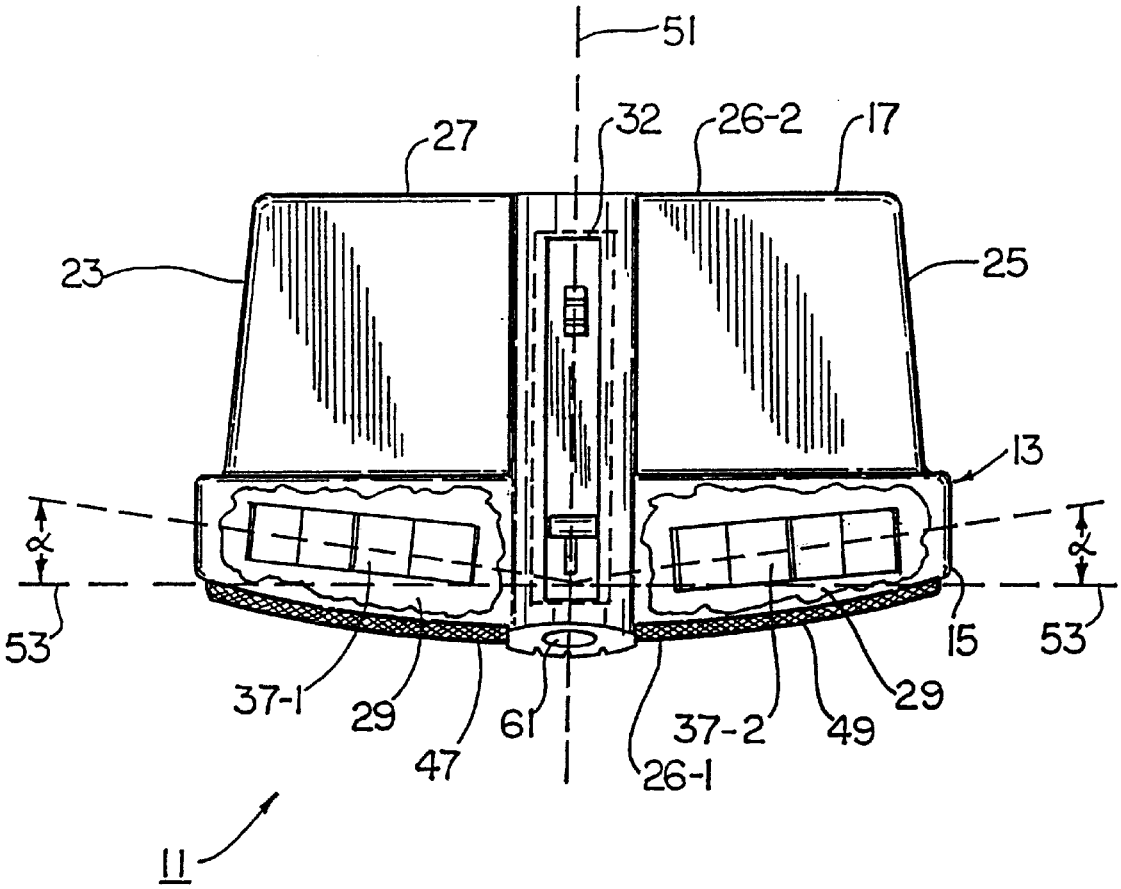
FIG. 3 is a diagrammatic top section view of the heater shown in FIG. 1.

Referring now to FIG. 3, PTC heater assemblies 37-1 and 37-2 are shown orientated inside housing 13 in an angular fashion in order to provide a diverging column of heated air. As can be seen, heater assembly 37-1 is disposed on left side 23 of housing 13 and heater assembly 37-2 is disposed on right side 25 of housing 13. A left grille 47 and a right grille 49 are mounted on front portion 15 of housing 13, left grille 25 47 being aligned in parallel with heater assembly 37-1 and right grille 49 being aligned with heater assembly 37-2. Housing 13 has a longitudinal axis 51 and heater assemblies 37-1 and 37-2 are each disposed at an angle a from the normal 53 of longitudinal axis 51. In the present embodiment, angle $\alpha$ is approximately 7.5 degrees, which results in a diverging column of heated air, diverging at about 7.5 degrees on each side of axis 51; however, it should be noted that the present invention is not limited to an angle $\alpha$ of exactly 7.5 degrees since angle $\alpha$ may be increased or decreased to create different dispersion patterns of heated air. It should also be noted that the present invention is not limited to using only two heater assemblies 37-1 and 37-2. More than two heater assemblies 37-1 and 37-2 may be situated in heater 11 and be angularly orientated relative to each other.

Figure 4:
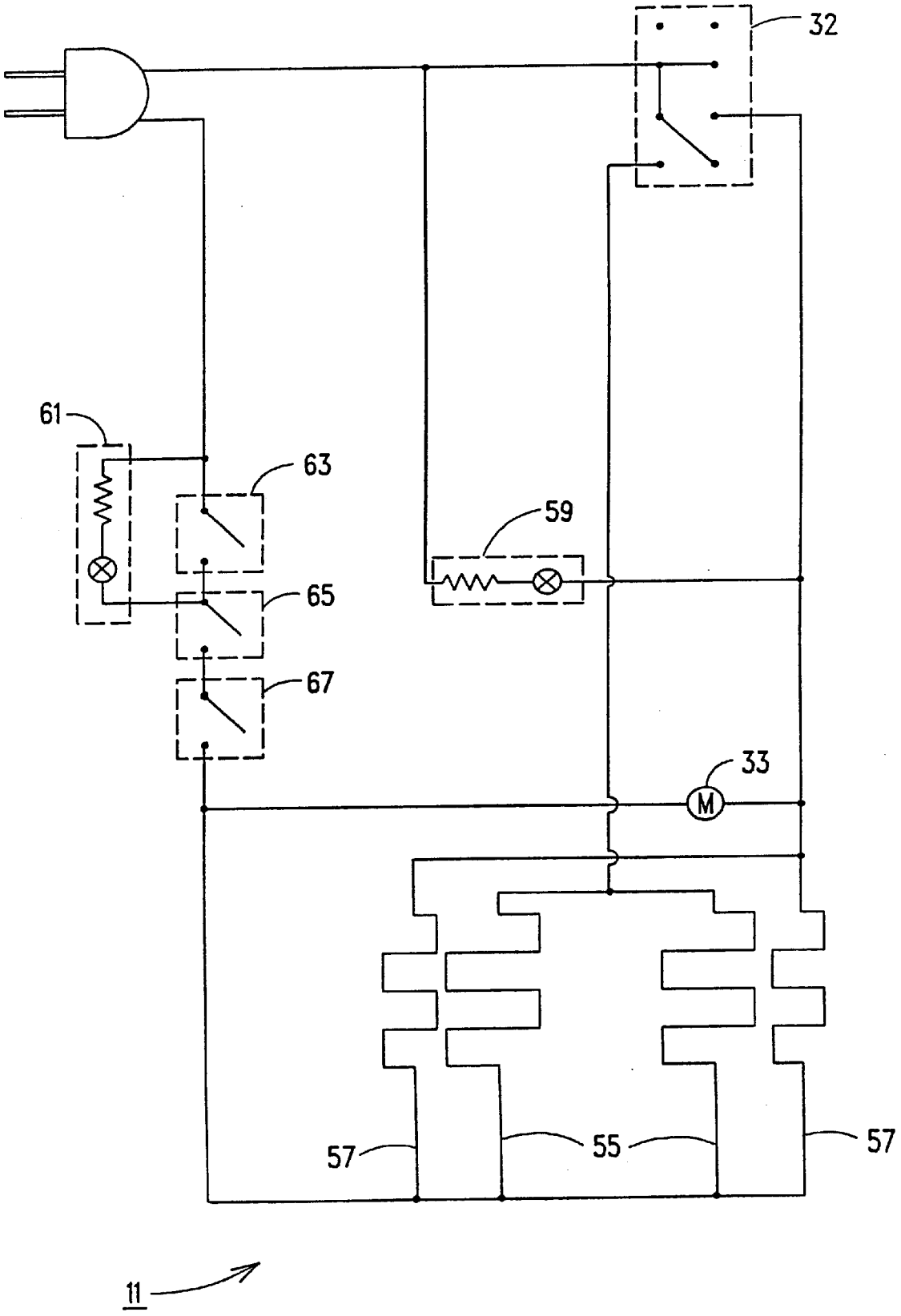
FIG. 4 is an electrical schematic of the heater shown in FIG. 1.
Figure 5:
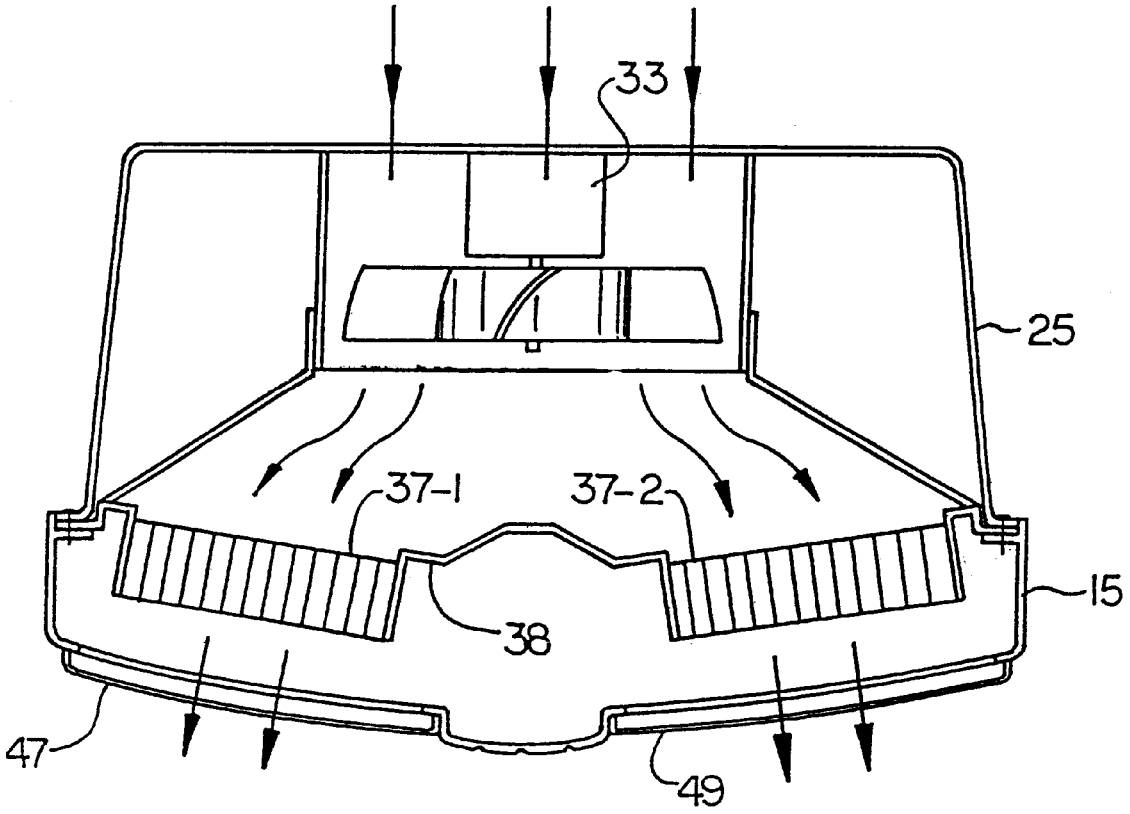
FIG. 5 is a top sectional view of the heater shown in FIG. 1, the path of the air flow being indicated by arrows.

Referring now to FIG. 4, there is shown a schematic of heater 11. The circuit diagram for heater 11 comprises a pair of high temperature heating elements 55, a pair or low temperature heating elements 57, a fan motor 33, a main switch 32, a power indicator lamp 59, a temperature indicator lamp 61, an adjustable thermostat 63, a left manual reset switch 65, and a right manual reset switch 67.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A [positive temperature coefficient (PTC)] *portable electric space* heater comprising:

a) a housing having a front and a rear, said rear having an opening and said front having [a pair of openings] *at least one opening*;

b) a fan mounted within said housing for producing a flow of air into the housing from the opening in the rear and then out of the housing through the [pair of openings] *at least one opening* in the front;

c) a pair of [positive temperature coefficient (PTC)] heater assemblies disposed inside said housing [in front of said fan] in side by side, end to end relationship *and in front of said of fan*, said pair of [PTC] heater assemblies being angled relative to each other *such* that air drawn in to the housing by the [front] fan passes through said [PTC] heater assemblies and emerges *through the at least one front opening* as a diverging column of heated air[, each PTC heater assembly comprising a plurality of ceramic PTC pellets situated in a grid of conductive material] *dispersed over a large area for quickly heating a room*;

d) *a contiguous* heater assembly support [means] *structure having a pair of mounting openings therein for mounting the heater assemblies in side by side, end to end divergently angled relationship within* [inside said housing for holding said PTC heater assemblies in place in] said housing; *and*

[e) a grille in each opening in the front of said housing, each grille being aligned parallel with one of said PTC heater assemblies; and]

[f]*e*) a plenum *provided* [mounted] inside said housing *positioned* behind said [PTC] heater assemblies;

[g]*f*) said plenum [together with] *having an outer periphery coupled to* said heater assembly support [means] *structure for* directing all of the air drawn into said housing from the opening in the rear by said fan [into] *through* said [PTC] heater assemblies *to provide the diverging column of heated air*.

2. [The PTC] *A portable electric space* heater [assembly] as [claimed in] *defined by* claim 1 wherein the housing has a longitudinal axis and each heater assembly is angled from said longitudinal axis at approximately 7.5 degrees from normal.

*3. A portable electric space heater as defined by claim 1 wherein the heater assemblies are positive temperature coefficient (PTC) heater assemblies.*

*4. A portable electric space heater as defined by claim 3 wherein the PTC heater assemblies further comprise a plurality of ceramic PTC pellets situated in a grid of conductive material.*

*5. A portable electric space heater as defined by claim 1 further including a grille in the at least one opening in the front of said housing.*

*6. A portable electric space heater comprising:*

*a housing having an air intake opening in a rear portion thereof and an air exhaust opening in a front portion thereof;*

*a fan mounted within the housing for producing a flow of air into the housing through the intake opening and out of the housing through the exhaust opening;*

*a pair of heater assemblies positioned in side-by-side, end to end relationship within the housing;*

*an inner air directing structure mounted within the housing including a contiguous heater assembly support structure having a pair of mounting openings for securing the heater assemblies therein, and an air directing duct, the heater assemblies being mounted in the heater assembly support structure divergently angled relative to each other, the air directing duct including a first portion for substantially surrounding the fan and being in fluid communication with the air intake opening and a wider second portion having an outer periphery which substantially surrounds at least the heater assembly mounting openings of the heater assembly support; the air directing structure guiding all of the air*

*entering the air intake through the heater assemblies and out the air exhaust opening of the housing as diverging columns of heated air dispersed over a large area to heat a room.*

*7. A portable electric space heater as claimed in claim 6, wherein the front portion of the housing is arcuately shaped to permit exhausted heated air to be dispersed over a large area.*

*8. A portable electric space heater as claimed in claim 6, wherein the wider second portion of the air directing duct is substantially frustoconically shaped.*

*9. A portable electric space heater as claimed in claim 6, wherein the heater assemblies are divergently angled at approximately 7.5 degrees from normal.*

*10. A portable electric space heater as claimed in claim 6, wherein the heater assemblies are positive temperature coefficient heater assemblies.*

*11. A portable electric space heater as claimed in claim 6, wherein the heater assemblies are mounted in side-by-side relationship such that substantially no air passes therebetween.*

*12. A portable electric space heater as claimed in claim 6, further including a thermostatic switch electrically connected to a power supply for terminating power to the heater assemblies upon sensing a predetermined temperature.*

*13. A portable space heater comprising:*

*a housing having an air intake opening in a rear portion thereof and an air exhaust opening in a front portion thereof;*

*a fan mounted within the housing for producing a flow of air into the housing and out through the exhaust opening;*

*a pair of heater assemblies positioned within the housing;*

*an inner air directing structure mounted within the housing including a contiguous heater assembly support structure for securing the heater assemblies in side-by-side, end to end relationship therein and an air directing duct, the heater assembly support and air directing duct configured to cooperate in directing the air through the heater assemblies, the heater assemblies being oriented with respect to the air exhaust opening, the air directing structure and each other so that all of the air to be heated is directed through the heater assemblies and out of the air exhaust opening of the housing as diverging columns of heated air dispersed over a large area to heat a room.*

*14. A portable space heater as claimed in claim 13, wherein the heater assemblies are secured to the heater assembly support structure in side-by-side relationship such that substantially no air passes between the heater assemblies and heater assembly support structure.*

* * * * *

UNITED STATES PATENT AND TRADEMARK OFFICE

CERTIFICATE OF CORRECTION

PATENT NO. : RE 37,642 E
DATED : April 9, 2002
INVENTOR(S) : Andrew M. Goldstein It is certified that error appears in the above-identified patent and that said Letters Patent is hereby corrected as shown below:

Column 1,
Lines 40, 41 and 43, now reads “FTC”; should read -- PTC --.

Column 2,
Line 49, now reads “teachings of the present inventor”; should read -- teachings of the present invention --.

Column 3,
Line 28, now reads “left grille 25-47”; should read -- left grille 47 --.
Line 30, now reads “at an angle a”; should read -- at an angle α --.

Signed and Sealed this

Thirty-first Day of December, 2002

JAMES E. ROGAN
*Director of the United States Patent and Trademark Office*